US006057525A

United States Patent [19]

Chang et al.

[11] Patent Number: 6,057,525

[45] **Date of Patent: *May 2, 2000**

[54] METHOD AND APPARATUS FOR PRECISION LASER MICROMACHINING

[75] Inventors: Jim Chang, San Ramon; Bruce E. Warner, Pleasanton; Ernest P. Dragon, Danville, all of Calif.

[73] Assignee: United States Enrichment Corporation, Bethesda, Md.

[ * ] Notice: This patent is subject to a terminal disclaimer.

[21] Appl. No.: 08/926,657

[22] Filed: Sep. 10, 1997

Related U.S. Application Data

[63] Continuation-in-part of application No. 08/523,321, Sep. 5, 1995, Pat. No. 5,744,780.

[51] Int. Cl.[7] ............................ B23K 26/18; B23K 26/14

[52] U.S. Cl. ................................ 219/121.73; 219/121.68

[58] Field of Search ......................... 219/121.67, 121.68, 219/121.69, 121.72, 121.74, 121.75, 121.83; 250/341.3; 356/5.14; 372/94

[56] References Cited

U.S. PATENT DOCUMENTS

| | | | |
|---|---|---|---|
| 4,105,919 | 8/1978 | Bridges et al. | 250/341.3 |
| 4,286,212 | 8/1981 | Staebler et al. | 359/221 |
| 4,530,600 | 7/1985 | Lopez | 356/5.14 |

(List continued on next page.)

OTHER PUBLICATIONS

R. Steven Hargrove, et al; "Laser Materials Processing Applications at Lawrence Livermore National Laboratory," SPIE, vol. 1859 *Laser Isotope Separation* (1993), pp. 263–272.

K.I. Zemskov, et al.; "Laser Machining of Objects with Simultaneous Visual Monitoring in a Copper Vapor Oscillator–Amplifier System," *Sov. J. Quantum Electron*, 14 (2), Feb. 1984, 0049–1748/020288–03, ©1984 American Institute of Physics, pp. 288–290.

Product Literature for "Optics for Research—Precision Optical Components", 2 pages. ©1988.

J.J. Chang, et al., "Precision Micro Drilling With Copper Vapor Lasers," *ICALEO* (*1994*), pp. 323–332.

Company Literature for Physik Instrumente (PI), 3 pages. (No Date).

W.M. Steen. "Laser Material Processing," *Springer–Verlag* (1991), pp. 85–87.

(List continued on next page.)

*Primary Examiner*—Geoffrey S. Evans
*Attorney, Agent, or Firm*—David G. Beck, Esq.; Townsend and Townsend and Crew, LLP

[57] ABSTRACT

A method and apparatus for micromachining and microdrilling which results in a machined part of superior surface quality is provided. The system uses a near diffraction limited, high repetition rate, short pulse length, visible wavelength laser. The laser is combined with a high speed precision tilting mirror and suitable beam shaping optics, thus allowing a large amount of energy to be accurately positioned and scanned on the workpiece. As a result of this system, complicated, high resolution machining patterns can be achieved. A cover plate may be temporarily attached to the workpiece. Then as the workpiece material is vaporized during the machining process, the vapors condense on the cover plate rather than the surface of the workpiece. In order to eliminate cutting rate variations as the cutting direction is varied, a randomly polarized laser beam is utilized. A rotating half-wave plate is used to achieve the random polarization. In order to correctly locate the focus at the desired location within the workpiece, the position of the focus is first determined by monitoring the speckle size while varying the distance between the workpiece and the focussing optics. When the speckle size reaches a maximum, the focus is located at the first surface of the workpiece. After the location of the focus has been determined, it is repositioned to the desired location within the workpiece, thus optimizing the quality of the machined area.

19 Claims, 4 Drawing Sheets

U.S. PATENT DOCUMENTS

| | | | |
|---|---|---|---|
| 4,547,651 | 10/1985 | Maruyama | 219/121.67 |
| 4,905,252 | 2/1990 | Goldberg et al. | 372/94 |
| 4,917,484 | 4/1990 | Heinz | 359/224 |
| 5,057,664 | 10/1991 | Johnson et al. | 219/121.69 |
| 5,235,263 | 8/1993 | Boston et al. | 219/121.6 |
| 5,289,557 | 2/1994 | Sheinis et al. | 385/119 |
| 5,334,816 | 8/1994 | Sugiyama | 219/121.84 |
| 5,359,558 | 10/1994 | Chang et al. . | |
| 5,371,570 | 12/1994 | Morris et al. | 359/565 |
| 5,434,882 | 7/1995 | Chang | 372/92 |
| 5,493,096 | 2/1996 | Koh | 219/121.71 |
| 5,562,842 | 10/1996 | Laferriere | 219/121.83 |
| 5,744,780 | 4/1998 | Chang et al. | 219/121.73 |

OTHER PUBLICATIONS

R. Jones, C. Wykes, "Holographic and Speckle Interferometry: A discussion of the theory, practice and application of the techniques," *Cambridge University Press* (1989), pp. 52–55.

Melles Griot Optics Guide V, "*Retardation Plates* ," pp. 14–28 to 14–29. (No Date).

J.J. Chang, "Copper–Laser Oscillator With Ajoint–Coupled Self–Filtering Injection," reprinted from *Optics Letters*, vol. 20, No. 6 (Mar. 15, 1995), pp. 575–577.

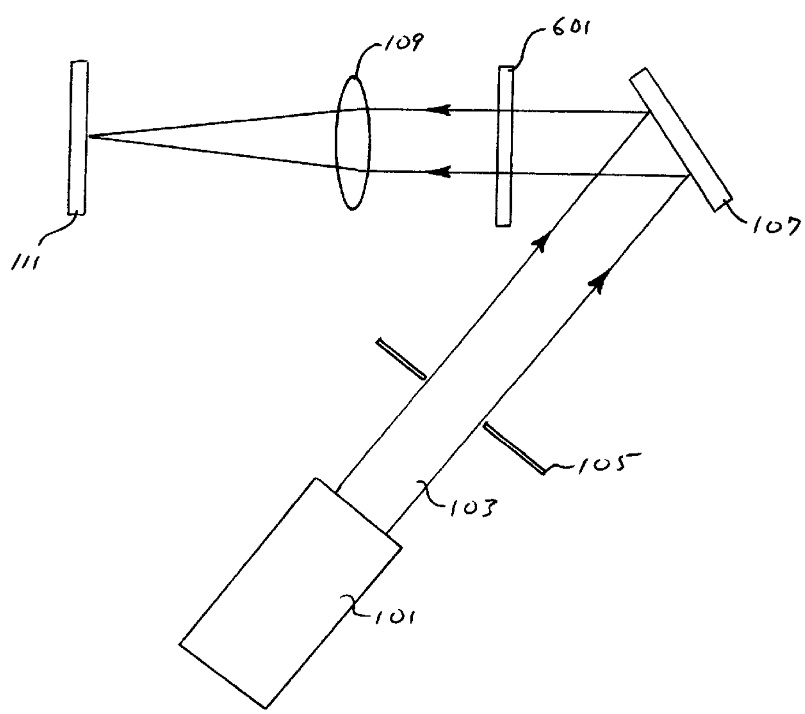
FIG. 6
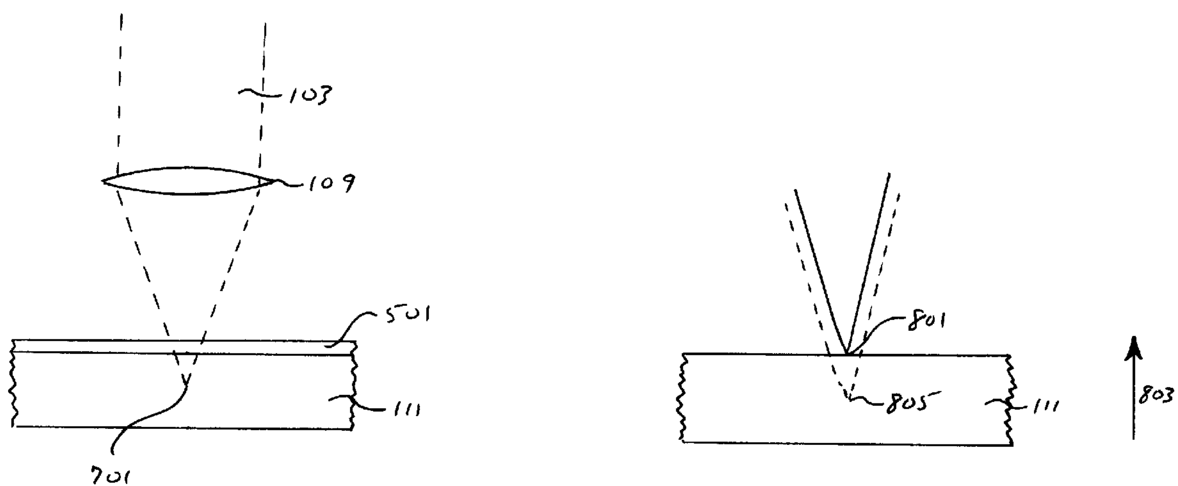
FIG. 7
FIG. 8

METHOD AND APPARATUS FOR PRECISION LASER MICROMACHINING

CROSS REFERENCE TO RELATED APPLICATIONS

This application is a Continuation-in-Part of U.S. application Ser. No. 08/523,321, filed Sep. 5, 1995, issued as U.S. Pat. No. 5,744,780 on Apr. 28, 1998, entitled APPARATUS FOR PRECISION MICROMACHINING WITH LASERS, the disclosure of which is incorporated herein by reference for all purposes.

GOVERNMENT RIGHTS NOTICE

The United States Government has rights in this invention pursuant to Contract No. W-7405-ENG-48 between the United States Department of Energy and the University of California for the operation of Lawrence Livermore National Laboratory.

BACKGROUND OF THE INVENTION

1. Field of the Invention

The present invention relates to laser material processing, and more specifically, it relates to precision micromachining with lasers.

2. Description of Related Art

Laser machining has found expanded use in automobile, aerospace, and electronics industries. For example, lasers are used in sheet metal cutting, drilling, and milling. In microelectronics, lasers are employed to scribe wafers, trim passive film elements, and obtain alloy p-n junctions of semiconductors. The advancements of laser machining are mainly due to the possibility of making small and unique structures that are difficult to achieve with conventional methods, and its applicability to traditionally hard-to-work materials such as ceramics, glass, and composite materials. Despite the advantages of laser machining, to date the introduction of precision laser micromachining to industry has been slowed by the lack of a well designed system.

Laser drilling has been widely used in industry because of its high production rate, capacity for rapidly varying hole size, and the ability to drill holes at shallow angles and in traditionally hard-to-work materials such as ceramics and composite materials. However, material removal based on conventional $CO_2$ or YAG lasers is primarily through melt expulsion which leads to poor dimensional control, a sizable recast layer, and microcracks on the hole sidewalls. The strong plasma-beam interaction at infrared (IR) wavelengths also makes the material removal during laser drilling less controllable. Furthermore, the reduced ability to focus the IR laser beam makes it more difficult to produce micron-sized holes with large aspect ratios (i.e., hole depth to diameter).

Conventional laser machining using high-power $CO_2$ and YAG laser systems are typically characterized by rough machining kerf, existence of recast layer and large heat affected zone, and relatively large feature size. As a result, these systems are seldom used in precision micromachining.

A more sophisticated laser system with increased processing control is therefore desired.

SUMMARY OF THE INVENTION

The present invention provides a method and apparatus for micromachining and microdrilling which results in a machined part of high surface quality. The system uses a near diffraction limited, high repetition rate, short pulse length, visible wavelength laser. The laser is combined with a high speed precision tilting mirror and suitable beam shaping optics, thus allowing a large amount of energy to be accurately positioned and scanned on the workpiece. As a result of this system, complicated, high resolution machining patterns can be achieved.

In one embodiment of the invention, a cover plate is temporarily attached to the workpiece. Then as the workpiece material is vaporized during the machining process, the vapors condense on the cover plate rather than the surface of the workpiece. The cover plate prevents the condensed vapors from adversely affecting the performance of the machined surface. If necessary, a cover plate may also be temporarily attached to the back surface of the workpiece.

In another embodiment of the invention, the laser beam passes through a half-wave plate before impinging on the workpiece. By rotating the half-wave plate, the polarization of the laser beam is randomized. A randomly polarized laser beam offers the advantage of having a cutting rate which is independent of the cutting direction.

In another embodiment of the invention, the focus of the laser beam is determining by monitoring the speckle size while varying the distance between the workpiece and the laser system. When the speckle size reaches a maximum the focus is located at the top surface of the workpiece. After the location of the focus has been determined, it can be repositioned with respect to the workpiece surface in order to optimize the quality of the machined area.

A further understanding of the nature and advantages of the present invention may be realized by reference to the remaining portions of the specification and the drawings.

BRIEF DESCRIPTION OF THE DRAWINGS

FIG. 6 is an illustration of an embodiment of the invention utilizing a randomly polarized laser beam;

FIG. 7 is an illustration of the location of the focus of the laser beam within the workpiece;

FIG. 8 illustrates the initial placement of the focus on the surface of the workpiece in preparation for optimizing the location of the focus within the workpiece.

DETAILED DESCRIPTION OF THE INVENTION

Figure 1:
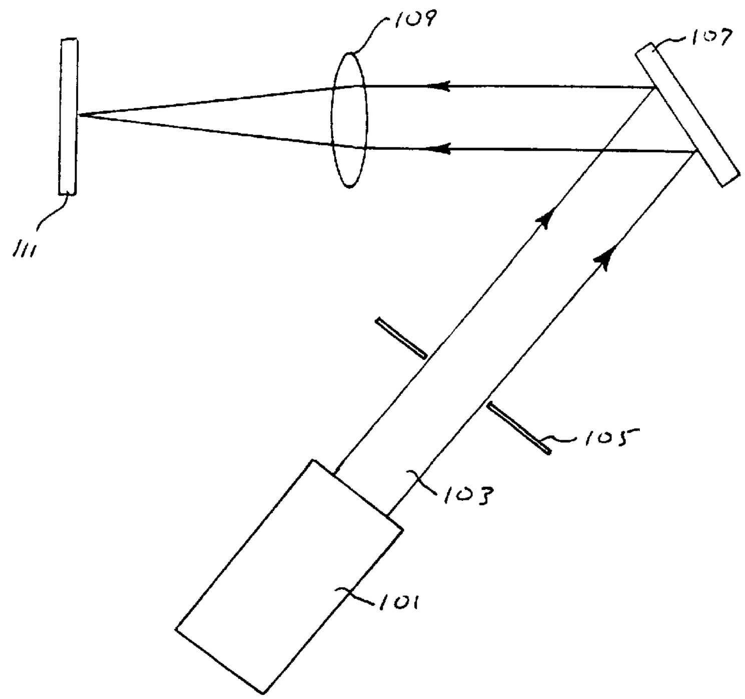
FIG. 1 is an illustration of a micromachining system according to the present invention.

FIG. 1 is an illustration of a laser micromachining system according to the present invention, the system utilizing a near diffraction limited laser system, a precision wavefront tilting mirror, and focussing optics. High aspect ratio straight holes characterized by smooth side walls with a negligible recast layer have been consistently produced. The use of a precision wavefront tilting mirror greatly reduces the hole size and roundness error, typically to less than a few microns. Micromachining and microdrilling on a variety of ceramics has also been demonstrated with excellent results.

A laser 101 produces an output laser beam 103. Laser beam 103 preferably passes through an aperture 105 prior to impinging on a precision tilting mirror 107. Precision tilting mirror 107 directs laser beam 103 through beam focussing optics 109 onto part 111.

In order to achieve precision micromachining, laser 101 must produce a near diffraction limited beam, preferably better than 2 times the diffraction limit. This high quality beam is required in order to achieve a small, well defined spot size, a necessary characteristic for precision micromachining. A short laser pulse output with a high peak power ensures that the material removed during the micromachining process is primarily the result of laser ablation, thus resulting in little recast layer formation. A high repetition rate on the order of multi-kHz allows high speed micromachining to be performed. A visible wavelength laser, for example a copper laser operating at 511 or 578 nanometers, has negligible surface plasma absorption as compared to IR and ultraviolet (UV) lasers. This characteristic leads to better coupling between the laser light and the material, resulting in smaller undesired plasma heating on the material. Frequency doubled green Nd:YAG lasers are known which exhibit the above characteristics.

The preferred embodiment of the invention uses an injection controlled copper vapor laser (CVL) oscillator with near diffraction limited beam quality as laser 101. The CVL beam quality is approximately 1.1 times the diffraction limit based on the Strehl ratio. The repetition rate of this laser is between 4 and 9 kHz, depending upon the requirements of the material processing application. The laser has an output of about 30 W at wavelengths of 511 nanometers (60%) and 578 nanometers (40%). The self-activated CVL used in this system typically has a pulse duration of 50–70 nanoseconds. For applications requiring higher laser power, the output of laser 101 may be amplified using an optional CVL amplifier, thus achieving approximately 250 watts.

The design of lasers meeting the above requirements are well known by those of skill in the art. For example, the February 1984 article by Zemskov et al. entitled *Laser Machining of Objects with Simultaneous Visual Monitoring in a Copper Vapor Oscillator-Amplifier System* discloses a short pulse, high repetition rate, visible laser. (Sov. J. Quantum Electron. 14(2), 288–290). In the Volume 20, Number 6 issue of Optics Letters dated Mar. 15, 1995, an article entitled *Copper-Laser Oscillator with Adjoint-Coupled Self-Filtering Injection* was published at pages 575–577 which clearly describes a laser resonator achieving near diffraction-limited beam quality. This short pulse, high repetition rate laser had a beam quality of 1.1–1.3 times the diffraction limit. Lastly, U.S. Pat. No. 5,434,882 provides further details of an injection-controlled laser resonator. Although the above references are not exhaustive, they briefly indicate the level of expertise in the area of laser design for lasers meeting the requirements of the present invention and are incorporated herein by reference for all purposes.

Precision x-y tilt mirror 107 is used to scan the focussed laser beam on the material to be machined, thus defining the machined feature size and shape. The mirror preferably has voltage controlled x and y axis drives that are capable of microradian tilt control at 1 to 1000 Hz. A commercially available mirror meeting the above requirements is produced by Physik Instrumente of Germany. This tilting mirror has two tilting axes capable of microradian tilt control at 500 Hz for large signals and 2 kHz for small signals. Furthermore U.S. Pat. No. 4,917,484, incorporated herein by reference, discloses a mirror capable of tilting along two axes and offering microradian tilt control.

When combined with appropriate beam shaping optics, the tilt in the beam propagation direction translates into a position change on the part to be machined. Complicated machining patterns can be achieved by designing the waveforms and amplitudes that drive the tilts of both x and y axes of the mirror. For example, two sinusoidal voltage signals of equal amplitude and 90 degree phase delay between the x and y axis will machine a circular cylinder. To improve its scanning precision, preferably a servo feedback loop that compensates for the hysteresis of the mirror tilt is used.

To perform precision laser machining, the size of the laser beam on part 111 is reduced to a near diffraction limited spot of micron scaled size. Focussing optics 109 may utilize either one or more lenses, one or more curved mirrors, or some combination of the two. In the preferred embodiment an achromatic lens system produced by OFR Precision Optical Components is used to focus laser beam 103 to the desired size.

When a laser spot with a well defined pattern is required on part 111, focussing optics 109 images an apertured laser beam on part 111. The shape of aperture 105 is only limited by the specific application. Preferably the system has diffraction limited performance over its aperture so that laser beam propagation angle tilts are faithfully reproduced as position changes in the focal or image planes at part 111.

Figure 2:
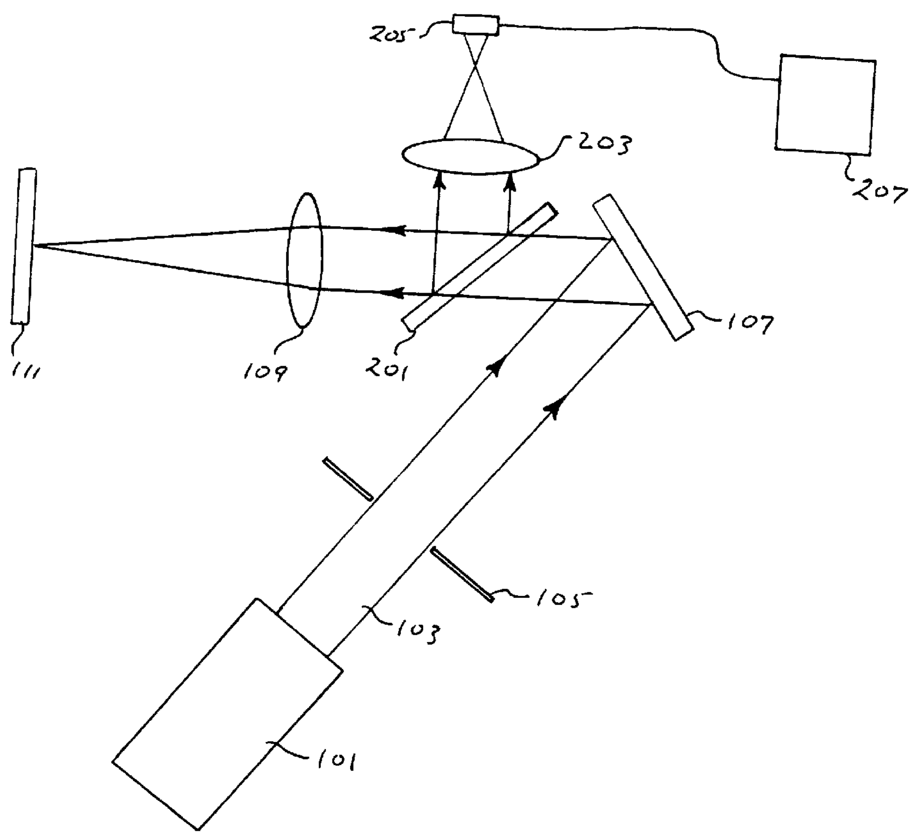
FIG. 2 is an illustration of an embodiment of the invention utilizing a diagnostic camera.

FIG. 2 is an illustration of an embodiment of the invention which allows a user to monitor the micromachining process. In this embodiment a beamsplitter 201 reflects light from workpiece 111 through an optic 203 where it is imaged onto a camera 205. The output of camera 205 is coupled to a monitor 207.

In CVL percussion drilling, a stationary laser beam is used to drill through a stationary workpiece. Straight parallel holes with aspect ratios better than 40:1 have been repeatedly produced in a variety of steels. Since material removal in this case is mainly due to laser ablation, these holes show no measurable heat affected zone and the hole quality is distinctively superior to those drilled with long pulse $CO_2$ and Nd:YAG lasers. Smaller hole sizes can also be achieved using lower laser power and faster focusing optics. Since the coupling between the sidewall of a drilled hole and the laser beam is very poor due to high incidence angle, the laser peak power on the hole entrance must be more than a few gigawatts per square centimeter in order to avoid hole taper.

Although straight holes free of recast layer can be produced by a simple CVL percussion drilling at a fairly fast speed, the hole dimensional control and hole repeatability are generally not satisfactory for high precision applications. Typically a tolerance of hole size and roundness of approximately 5–10% of its diameter is expected. Higher precision microdrilling must be accomplished by laser trepanning. Laser trepanning has been applied in industry to either improve the hole accuracy or to generate large holes, mostly for hole aspect ratios (depth to diameter) less than 1:1. Precision microtrepanning for high-aspect-ratio holes has rarely been accomplished because of difficulties in material penetration and removal. In the present invention, laser trepanning is achieved by periodically tilting the x-y scanning mirror such that the laser spot generates the desired pattern on the workpiece. Trepanned holes with hole aspect ratio greater than 10:1 have been demonstrated. The holes on both sides demonstrate an extremely well defined circular pattern without erosion.

Repeatability of hole dimension has been significantly improved with the present invention. This striking improvement on hole repeatability is believed to be mainly due to the fact that laser trepanning with the present invention not only performs material removal during the initial drilling phase, but also engages in material trimming and sidewall polishing during the later drilling phase due to high laser repetition rate and high beam scanning frequency. Detailed examination of the hole section revealed that the recast layer and heat-affected zone were minimized to a non-measurable level (i.e., sub micron-scale).

In addition to circular holes, trepanning non-circular holes with various geometries on a 1 millimeter thick piece of stainless steel has been demonstrated. These holes were cut by modifying the scanning pattern of the trepanning system to draw the desired shape on the target. Hole aspect ratios higher than 10:1 with no taper have been achieved with these noncircular trepanned holes. This demonstration of noncircular microholes with high aspect ratios reveals the great potential of the present invention in laser micromachining applications, and may have significant impact on engineering designs traditionally limited to circular holes.

Advanced fine ceramics have many excellent physical and chemical properties for use in high-density electronics fabrication and packaging; however, their hardness and brittleness make them difficult to machine even with diamond tools. The noncontact nature of laser micromachining precludes the problem of tool wear and also minimizes any unacceptable microstructure change. The laser machining methods using conventional $CO_2$ and YAG lasers have a disadvantage of developing thermal-stress induced cracks on ceramics. The use of high-radiance short-pulse CVL minimizes the material bulk heating such that crack-free micromachining processing becomes feasible.

Grooves 120 micrometers wide and 120 micrometers deep have been laser milled on a piece of 1.25 millimeters thick silicon carbide with a CVL producing approximately 40 watts. Detailed examination of the grooves showed straight sidewalls and a fairly flat bottom. The holes in the part were trepanned with 70 watts from a CVL. The hole diameters in the part were 1.25 and 2.5 millimeters. The hole roundness was perfect and no material crack was observed.

Micromachining on alumina and silicon nitride has also been demonstrated with promising results. This crack-free machining of a variety of ceramics represents a great potential for using the CVL based micromachining system of the present invention in the electronics industry.

Figure 3:
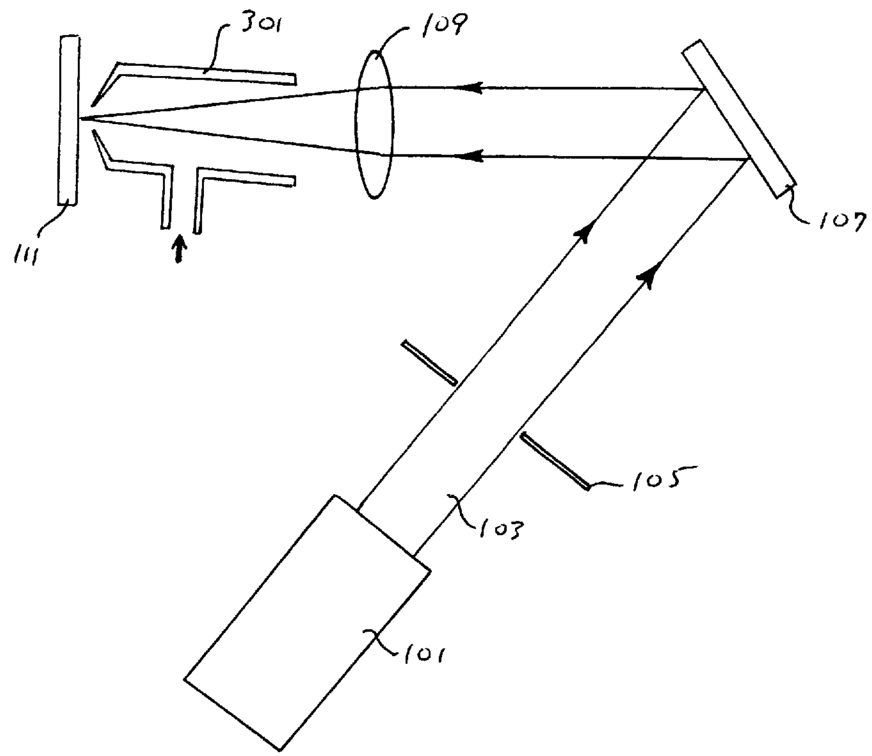
FIG. 3 is an illustration of an embodiment of the invention utilizing a gas nozzle.

FIG. 3 is an illustration of an embodiment of the invention utilizing a gas nozzle 301. Gas nozzle 301 directs a supply of gas onto workpiece 111 during the machining process. Depending upon the material of workpiece 111 as well as the gas being used, both the machining speed and quality may be improved. For example, oxygen may be used to increase the machining speed due to exothermic reactions. Gases may also improve the machining process by blowing away ablated material, thus improving the coupling of laser beam 103 with workpiece 111.

Figure 4:
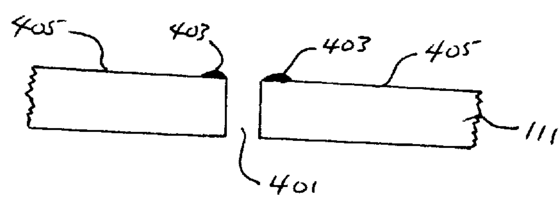
FIG. 4 illustrates vapor condensation during the micromachining process.

The quality of the finished workpiece is often compromised due to the condensation of vapor on the surface of the workpiece. FIG. 4 is an illustration of the cross-section of workpiece 111 after the fabrication of a hole 401. During the machining process, workpiece material is vaporized. This vaporized material subsequently condenses, at least in part, at areas 403 next to hole 401. Condensed material 403 reduces the smoothness of surfaces 405 of workpiece 111 which may affect the performance of hole 401. For example, if hole 401 is an orifice for a fuel injector, condensed material 403 may adversely affect the flow properties of the injector. Furthermore, since condensed material 403 does not assume the same shape every time, the flow properties through the injector may vary considerably, leading to poor component reproducibility.

Condensed material 403 may adversely affect the quality of the final machined component in other ways. For example, condensed material 403 is generally more prone to cracking than workpiece material 111. However, once a crack starts within material 403, it typically continues to propagate past the edge of material 403 and into workpiece 111.

Condensed material 403 may also adversely affect the deposition of coatings onto the surface of workpiece 111 after completion of the machining process. For example, coatings may not adhere to material 403 as well as it does to workpiece material 111.

Figure 5:
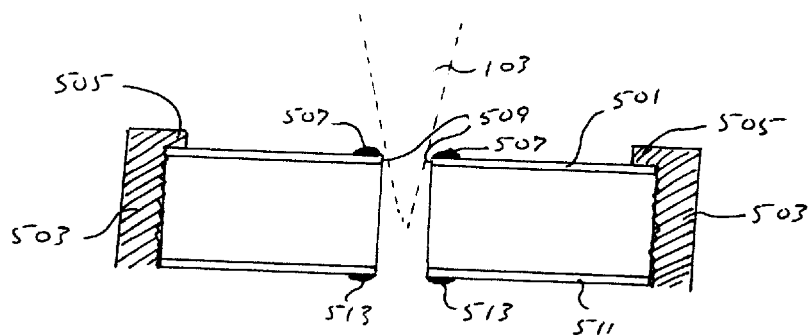
FIG. 5 is an illustration of an aspect of the present invention which reduces the effects of vapor condensation.

FIG. 5 is an illustration of an aspect of the present invention which reduces the effects of vapor condensation. In this embodiment of the invention a cover plate 501 is attached to workpiece 111 facing laser beam 103 prior to machining. Cover plate 501 is held into place using a mounting fixture which securely holds plate 501 against the surface of workpiece 111. The mounting fixture can be as simple as a jig 503 with a lip 505 which compresses plate 501 against workpiece 111. During the micromachining process, the vapors exiting the machined area condense on plate 501 at areas 507. Thus removing plate 501 removes the condensed vapors, leaving an unaffected surface.

In micromachining or microdrilling, the laser beam has a predetermined energy distribution. Although only a portion of the energy distribution will have sufficient energy to 'machine' the surface, the remaining portions of the distribution will still impinge upon the surface, potentially having an adverse effect. For example, if the energy distribution is a gaussian, the central portion of the distribution will have sufficient energy to machine the workpiece while the outer wings of the distribution will simply heat the area of the workpiece surface surrounding the area being machined. This heating process may alter the surface structure by annealing the surface or causing some other surface effect. Cover plate 501 protects the area of the workpiece surface surrounding the machined area from these effects.

The principal design considerations in selecting a material for cover plate 501 are rigidity, absorption, melting temperature, and the material's potential for depositing impurities during the machining process. Cover plate 501 must be rigid enough to be attachable to workpiece 111 without the use of adhesives or other bonding agents. Furthermore cover plate 501 must remain rigid during the micromachining process in order to prevent the condensation of vapors between plate 501 and the surface of workpiece 111.

The absorption of laser beam 103 by plate 501 must be sufficient to minimize the affects of the cover plate on the speed of the micromachining process. Furthermore the melting temperature must be high enough that after cover plate 501 is vaporized and laser beam 103 is vaporizing the material of workpiece 111, the edges 509 of plate 501 do not continue to melt away, exposing a portion of workpiece 111 to possible vapor condensation.

In the preferred embodiment of the invention, cover plate 501 is a foil made of stainless steel approximately 0.001 to 0.010 inches thick. This thickness provides sufficient rigidity to allow cover plate 501 to be easily attached to workpiece 111 while being thin enough to only minimally affect the speed of the machining process through absorption of laser beam 103. Furthermore, after the machining process is complete, it is easily removed from workpiece 111.

Cover plate 501 is not limited to foils made of stainless steel. Cover plate 501 may be made of other metals (e.g., aluminum) as well as ceramics (e.g., alumina). Although the preferred thickness of plate 501 is between 0.001 and 0.010 inches, other thicknesses may be used depending upon the material and thickness of workpiece 111 as well as the wavelength and power of the laser.

In another embodiment of the invention, a second cover plate 511 is attached to the back surface of workpiece 111. Although it is not necessary, typically cover plate 511 is of the same material and of the same thickness as cover plate 501. Preferably cover plate 511 is attached to workpiece 111 using the same mounting jig as used to attach plate 501 to sample 111. In FIG. 5, mounting jig 503 compresses plate 511 against workpiece 111. Plate 511 insures that any vapor exiting the back surface of workpiece 111 condenses on plate 511 at a site 513, as opposed to condensing on the back surface of the sample. This effect is less problematic with microdrilling than with micromachining due to the cut geometry. Furthermore, if the embodiment utilizes gas nozzle 301 as illustrated in FIG. 3, the gas may force the vapor through the machined area to the back surface, thus making the use of cover plate 511 more important.

Typically lasers produce a linearly polarized beam, the polarization resulting from the geometry of the laser cavity. For example, a laser utilizing a folded cavity will favor radiation with an electric vector at a right angle to the plane of incidence to the fold mirror. Unfortunately, the polarization of laser beam 103 strongly influences the coupling of beam 103 to workpiece 111. Therefore as the coupling varies, the cutting efficiency varies. As a result of changes in cutting efficiency, cutting speed variations of factors of two or more have been observed for micromachining as the cutting direction changes. Even microdrilling is effected since the walls of the intended hole will exhibit polarization sensitivity during the drilling process.

One approach to the polarization effects associated with micromachining has been to circularly polarize the laser beam. This technique eliminates the effects of polarization, allowing the micromachining process to operate equally well regardless of the direction.

In one embodiment of the invention, the polarization of laser beam 103 is randomized prior to the beam impinging on workpiece 111. It has been discovered that a randomly polarized laser beam is more efficient for micromachining than a circularly polarized laser beam.

In the preferred embodiment, laser beam 103 passes through a half-wave plate 601, as illustrated in FIG. 6. The effect of half-wave plate 601 is to rotate the plane of polarization by an angle $2\theta$ where $\theta$ is the angle between the linearly polarized incident beam and the principal plane of half-wave plate 601. By continuously rotating half-wave plate 601 with a rotation mechanism 603, linearly polarized laser beam 103 is randomly polarized. The faster the rate of rotation of half-wave plate 601, the less effect polarization will play on the micromachining efficiency regardless of the cutting speed. In the preferred embodiment a rotational rate of 100 Hz was used.

In order to optimize the cutting efficiency as well as the quality of the micromachined substrate, the focus of laser beam 103 must be accurately positioned with respect to the surface of workpiece 111. The placement of the focus may be varied, depending primarily upon the material being machined as well as the application. Thus it may be preferable to place the focus at the front surface of the material to be machined, at the back surface of the material to be machined, or anyplace in-between.

FIG. 7 is an illustration of the placement of the focus with respect to the surface of workpiece 111 according to one embodiment of the invention in which it is desirable to have the focus 701 of laser beam 103 located in the middle of the material to be machined. Thus if the workpiece 111 includes a cover plate 501, focus 701 is located in the middle of the composite structure as shown. Similarly, if the material to be machined consists only of workpiece 111, focus 701 is located in the middle of workpiece 111 in this embodiment of the invention.

In the preferred embodiment of the invention, focus 701 is initially placed on the surface of the workpiece or, if a cover plate is used, on the surface of the cover plate. Once the focus is determined and placed at the surface of the workpiece (or composite workpiece), the workpiece can be moved towards beam 103 by the amount necessary to place the focus in the desired location within the workpiece. For example, in FIG. 8 the focus would initially be placed at a spot 801 located on the surface of workpiece 111. Assuming that the desired location for the focus is in the middle of the material, workpiece 111 would then be moved in a direction 803 a distance equal to half the thickness of workpiece 111, resulting in the focus being moved to a location 805.

Figure 9:
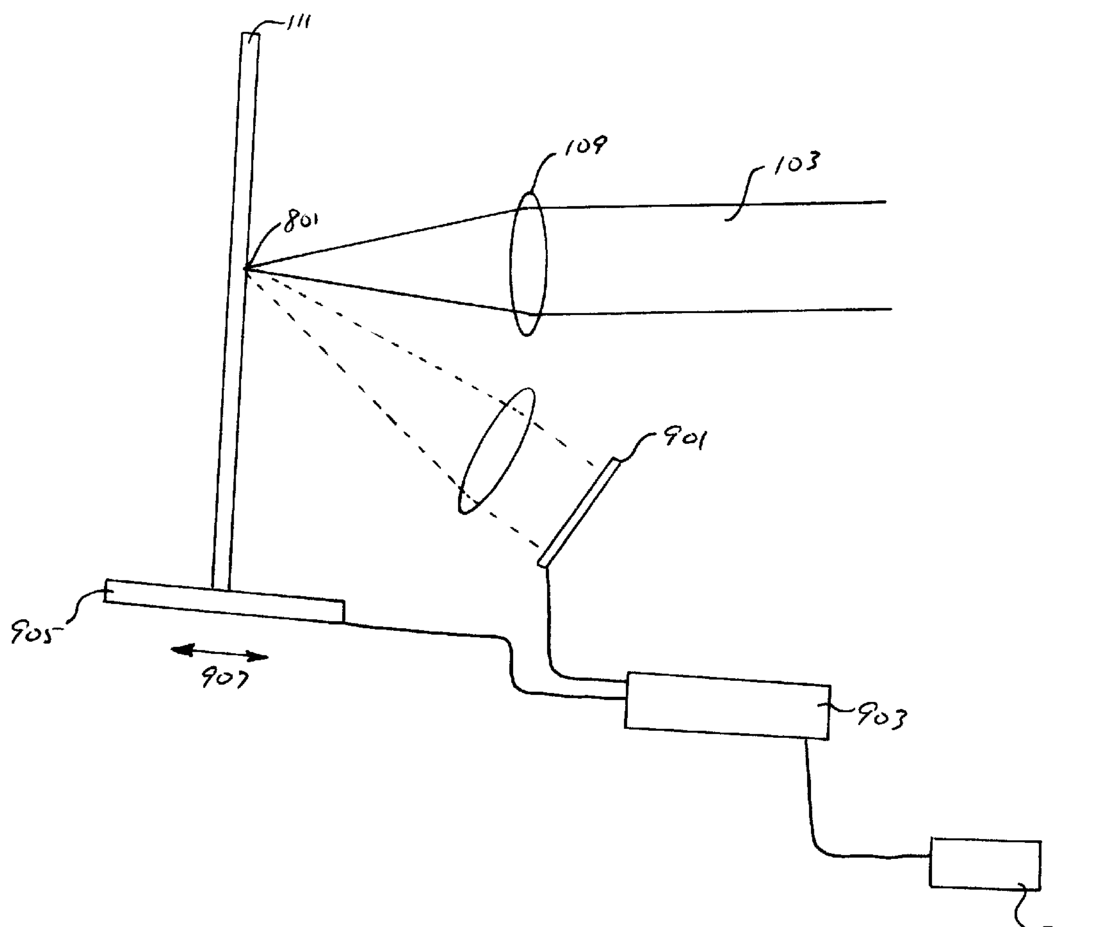
FIG. 9 is an illustration of a method of locating the focus of the laser beam at the surface of the workpiece.

In order to determine the initial location of the focus of laser beam 103 and place it at a position 801, the speckle pattern associated with the illuminated portion of the sample is imaged, thus allowing the relative size of the speckle to be determined. The system illustrated in FIG. 9 uses a detector array 901, such as a high resolution CCD array, to monitor the relative speckle size. A simpler design, not shown, utilizes a telescope and a graduated reticle.

Speckle is a well known phenomenon which is the result of the spatial coherence of laser light. The laser light, when scattered off of a diffuse surface, forms a stationary interference pattern which appears to the viewer as a granulated or speckled pattern. The size of the speckles is inversely proportional to the size of the illuminated area. Thus as the size of the illuminated area decreases, the size of the speckles increases.

According to the present invention, the focus of laser beam 103 is initially placed at the surface of workpiece 111 (or at the surface of cover plate 501 if a composite structure is to be machined) by monitoring the speckle pattern. When laser beam 103 is focussed on the surface, a minimum area is illuminated resulting in the maximum speckle size. Once the maximum speckle size and thus the focus is found, workpiece 111 is moved toward laser beam 103 as discussed above and illustrated in FIG. 8.

In an alternate embodiment of the invention, the output of detector array 901 is coupled to a processor 903. Processor 903 is also coupled to a micropositioning system 905 which is capable of moving workpiece 111 along an axis 907. In operation, processor 903 automatically moves workpiece 111 back and forth until the maximum speckle size is determined indicating that the focus of the laser beam is at location 801 on the surface of workpiece 111. If the thickness of workpiece 111 has been input into processor 903 using an input device 909, processor 903 automatically relocates workpiece 111, placing the determined focal point at the desired location within workpiece 111. As previously described, in one embodiment the focal point is placed at a location in the exact middle of the composite workpiece.

As will be understood by those familiar with the art, the present invention may be embodied in other specific forms without departing from the spirit or essential characteristics thereof. Accordingly, disclosure of the preferred embodiment of the invention is intended to be illustrative, but not limiting, of the scope of the invention which is set forth in the following claims.

What is claimed is:

1. An apparatus for precision micromachining and microdrilling a workpiece, comprising:

a laser beam produced by a laser, wherein said laser beam has a beam quality better than 2 times the diffraction limit, a pulse length less than 1 microsecond, a repetition rate greater than 2 kHz, and a wavelength that is in the visible range;

an x-y tilt mirror to direct and scan said laser beam onto said workpiece, wherein said x-y tilt mirror comprises voltage controlled x and y axis drives that are capable of microradian tilt control at 1 to 1000 Hz;

a half-wave plate, said laser beam passing through said half-wave plate prior to impinging on said workpiece;

a rotation mechanism coupled to said half-wave plate; and focussing optics to reduce the size of said laser beam to a near diffraction limited spot size prior to said laser beam impinging on said workpiece.

2. The apparatus of claim 1, wherein said near diffraction limited spot size has a diameter of approximately 1 micrometer.

3. The apparatus of claim 1, wherein said rotation mechanism rotates said half-wave plate at 100 Hz.

4. The apparatus of claim 1, further comprising an assist gas nozzle located between said focussing optics and said workpiece.

5. The apparatus of claim 4, wherein a gas passing through said assist gas nozzle is selected from the group consisting of nitrogen, oxygen, and inert gases.

6. The apparatus of claim 1, further comprising a cover plate attached to a front surface of said workpiece, said cover plate collecting vapor deposits during said precision micromachining and microdrilling process.

7. The apparatus of claim 6, wherein said cover plate is comprised of a metal foil.

8. The apparatus of claim 7, wherein said metal foil has a thickness in the range of 0.001 to 0.002 inches.

9. The apparatus of claim 1, further comprising a back cover plate attached to a back surface of said workpiece, said back cover plate collecting vapor deposits during said precision micromachining and microdrilling process.

10. The apparatus of claim 1, further comprising:

a beamsplitter positioned between said focussing optics and said x-y tilt mirror, said beamsplitter configured to reflect an image from said workpiece; and an imaging optic, said imaging optic imaging said workpiece image onto a detector array of a diagnostic camera.

11. The apparatus of claim 1, wherein said laser is selected from the group consisting of a copper vapor laser and a frequency doubled Nd:YAG laser.

12. An apparatus for precision micromachining and microdrilling a workpiece, comprising:

a laser beam produced by a laser, wherein said laser beam has a beam quality better than 2 times the diffraction limit, a pulse length less than 1 microsecond, a repetition rate greater than 2 kHz, and a wavelength that is in the visible range;

an x-y tilt mirror to direct and scan said laser beam onto said workpiece, wherein said x-y tilt mirror comprises voltage controlled x and y axis drives that are capable of microradian tilt control at 1 to 1000 Hz;

focussing optics to reduce the size of said laser beam prior to said laser beam impinging on said workpiece;

a translation stage coupled to said workpiece, said translation stage controlling a distance separating said workpiece from said focussing optics;

imaging optics to image a speckle pattern produced by said laser beam impinging on said workpiece, said speckle pattern comprised of a plurality of speckles; and means for determining a relative size of said plurality of speckles as a function of said distance separating said workpiece from said focussing optics, wherein a maximum speckle size indicates a minimum laser beam diameter at a first surface of said workpiece.

13. The apparatus of claim 12, wherein said relative size determining means is further comprised of a graduated reticle.

14. The apparatus of claim 12, wherein said relative size determining means is further comprised of a detector array and a processor.

15. The apparatus of claim 12, further comprising a cover plate attached to said front surface of said workpiece, said cover plate collecting vapor deposits during said precision micromachining and microdrilling process, wherein a maximum speckle size indicates a minimum laser beam diameter at a first surface of said cover plate.

16. An apparatus for precision micromachining and microdrilling a workpiece, comprising:

a laser beam produced by a laser, wherein said laser beam has a beam quality better than 2 times the diffraction limit, a pulse length less than 1 microsecond, a repetition rate greater than 2 kHz, and a wavelength that is in the visible range;

an x-y tilt mirror to direct and scan said laser beam onto said workpiece, wherein said x-y tilt mirror comprises voltage controlled x and y axis drives that are capable of microradian tilt control at 1 to 1000 Hz;

focussing optics to reduce the size of said laser beam prior to said laser beam impinging on said workpiece;

a translation stage coupled to said focussing optics, said translation stage controlling a distance separating said workpiece from said focussing optics;

imaging optics to image a speckle pattern produced by said laser beam impinging on said workpiece, said speckle pattern comprised of a plurality of speckles; and means for determining a relative size of said plurality of speckles as a function of said distance separating said workpiece from said focussing optics, wherein a maximum speckle size indicates a minimum laser beam diameter at a first surface of said workpiece.

17. A method of precision micromachining and microdrilling, said method comprising the steps of:

directing a laser beam to an x-y tilt mirror, wherein said laser beam has a beam quality better than 2 times the diffraction limit, a pulse length less than 1 microsecond, a repetition rate greater than 2 kHz, and a wavelength that is in the visible range;

steering said laser beam onto a workpiece with said x-y tilt mirror, wherein said x-y tilt mirror comprises voltage controlled x and y axis drives that are capable of microradian tilt control at 1 to 1000 Hz;

passing said laser beam through a half-wave plate prior to said steering step;

rotating said half-wave plate around an axis parallel to said laser beam; and focussing said laser beam to approximately a micrometer in diameter prior to said steering step.

18. A method of precision micromachining and microdrilling, said method comprising the steps of:

directing a laser beam to an x-y tilt mirror, wherein said laser beam has a beam quality better than 2 times the diffraction limit, a pulse length less than 1 microsecond, a repetition rate greater than 2 kHz, and a wavelength that is in the visible range;

steering said laser beam onto a workpiece with said x-y tilt mirror, wherein said x-y tilt mirror comprises voltage controlled x and y axis drives that are capable of microradian tilt control at 1 to 1000 Hz;

focussing said laser beam with focussing optics to approximately a micrometer in diameter prior to said steering step;

imaging a speckle pattern produced by said laser beam impinging on said workpiece, said speckle pattern comprised of a plurality of speckles;

varying a distance separating said workpiece from said focussing optics;

monitoring a relative speckle size of said plurality of speckles as said separating distance is varied; and determining an optimum separation distance between said workpiece and said focussing optics, said optimum separation distance corresponding to a maximum speckle size of said plurality of speckles and to a minimum beam diameter at a first surface of said workpiece.

19. The method of claim 18, further comprising the step of decreasing said distance separating said workpiece and said focussing optics by an amount equal to half a workpiece thickness, said decreasing step occurring after said distance is set at said optimum separation distance.

* * * * *